United States Patent
Lee et al.

(10) Patent No.: US 9,419,798 B2
(45) Date of Patent: Aug. 16, 2016

(54) PUBLIC ENCRYPTION METHOD BASED ON USER ID

(71) Applicant: Korea University Research and Business Foundation, Seoul (KR)

(72) Inventors: Dong Hoon Lee, Seoul (KR); Jong-Hwan Park, Seoul (KR); Woo-Kwon Koo, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 14/157,823

(22) Filed: Jan. 17, 2014

(65) Prior Publication Data
US 2015/0019868 A1    Jan. 15, 2015

(30) Foreign Application Priority Data
Jul. 15, 2013  (KR) .......................... 10-2013-0082745

(51) Int. Cl.
| | |
|---|---|
| H04L 29/00 | (2006.01) |
| H04L 9/30 | (2006.01) |
| H04L 9/08 | (2006.01) |
| H04L 29/06 | (2006.01) |

(52) U.S. Cl.
CPC ............ *H04L 9/3073* (2013.01); *H04L 9/0847* (2013.01); *H04L 63/126* (2013.01)

(58) Field of Classification Search
CPC ... H04L 9/3073; H04L 9/0847; H04L 9/3247; H04L 63/126; H04L 63/0442; H04L 63/0428
See application file for complete search history.

(56) References Cited

U.S. PATENT DOCUMENTS

| | | | | |
|---|---|---|---|---|
| 7,574,596 | B2 * | 8/2009 | Chen et al. | 713/159 |
| 8,397,988 | B1 * | 3/2013 | Zuili | 235/383 |
| 2003/0081785 | A1 * | 5/2003 | Boneh et al. | 380/277 |
| 2008/0298582 | A1 * | 12/2008 | Sakai | 380/44 |
| 2012/0166792 | A1 * | 6/2012 | Tan | 713/150 |

FOREIGN PATENT DOCUMENTS

JP         2011-237475         11/2011

* cited by examiner

*Primary Examiner* — Don Zhao
(74) *Attorney, Agent, or Firm* — Duane Morris LLP; J. Rodman Steele, Jr.; Gregory M. Lefkowitz (57) ABSTRACT

A public encryption method based on user ID includes: setting, by a key generation server, at least one public parameter and master key used for generating a private key; receiving, by the key generation server, an inherent ID of a user from a receiving terminal, generating a private key based on the public parameter, the master key and the ID, and transmitting the generated private key to the receiving terminal; receiving, by a transmitting terminal, the public parameter and the ID from the key generation server, encrypting a message to generate a ciphertext, and transmitting the generated ciphertext to the receiving terminal; and receiving, by the receiving terminal, the ciphertext and the private key, and decrypting the ciphertext based on the received private key to obtain a message.

5 Claims, 11 Drawing Sheets

Table 1

| | Representation sizes (bits) | | | | Computational costs | | | | | | | |
|---|---|---|---|---|---|---|---|---|---|---|---|---|
| | $Z_p$ | $G$ | $\hat{G}$ | $G_t$ | $G$ | | $\hat{G}$ | | | $G_t$ | | |
| | | | | | Fix-base exponentiation | General exponentiation | Fix-base exponentiation | General exponentiation | Hashing | Fix-base exponentiation | General exponentiation | Pairing | Ration of pairing |
| SS / 80 | 160 | 512 | 512 | 1024 | 2 | 10 | 2 | 10 | 10 | 2 | 10 | 100 | 120 |
| MNT / 80 | 160 | 171 | 1026 | 1026 | 0.2 | 1 | 8 | 40 | 40 | 2 | 10 | 100 | 120 |
| MNT / 128 | 256 | 512 | 3072 | 3072 | 3 | 15 | 100 | 500 | 500 | 30 | 150 | 1500 | 1800 |

FIGURE 11

Table 2

| | Curves / security level | Overheads (bits) | | | Relative computational costs | | |
|---|---|---|---|---|---|---|---|
| | | Public key size | Ciphertext size | Private key extraction | Encryption | Decryption |
| Existing technique 1 (BF) | MNT / 128 | 1024 | 768 | 1000 | 2006 | 1503 |
| Existing technique 2 (BB) | MNT / 128 | 4608 | 1280 | 200 | 39 | 1833 |
| Existing technique 3 (SK) | MNT / 128 | 4096 | 768 | 100 | 36 | 1536 |
| The present disclosure | SS / 80 | 2048 | 1024 | 28 | 26 | 130 |

PUBLIC ENCRYPTION METHOD BASED ON USER ID

CROSS-REFERENCE TO RELATED APPLICATIONS

This application claims priority under 35 U.S.C. §119 to South Korean Patent Application No. 10-2013-0082745 filed on Jul. 15, 2013, in the Korean Intellectual Property Office, the disclosure of which is incorporated herein by reference in its entirety.

TECHNICAL FIELD

The present disclosure relates to a public encryption method based on user ID, and more particularly, to a public encryption method based on user ID, which allows easy communication using a public key whose contents may be checked by an inherent ID of a user.

BACKGROUND

In a general public key system, each user terminal for performing private communication generates its private key and public key in a pair, and communication is available only when an opponent terminal for performing private communication obtains a proper public key. At this time, a user who has obtained the public key of the opponent terminal for performing communication receives a signature for the obtained public key from a trusted third party and uses the same as a certificate of the public key in order to prove that the obtained public key is proper.

Since the public key certificate connects the public key with justification to the identity of its owner, the user terminal trusts the public key obtained from the opponent terminal by means of the public key certificate, thereby performing communication with the opponent terminal.

However, when the public key certificate is discarded, the certificate-based public key system should maintain a discarded certificate list for a certain period or continuously manage such a discarded certificate, which consumes management time and costs.

SUMMARY

The present disclosure is directed to providing a public encryption method based on user ID, which may easily perform private communication between user terminals without executing a separate public key certifying process through a trusted third party by encrypting a public key with an inherent ID of a user.

In one aspect, there is provided a public encryption method based on user ID, which includes: setting, by a key generation server, at least one public parameter and master key used for generating a private key; receiving, by the key generation server, an inherent ID of a user from a receiving terminal, generating a private key based on the public parameter, the master key and the ID, and transmitting the generated private key to the receiving terminal; receiving, by a transmitting terminal, the public parameter and the ID from the key generation server, encrypting a message to generate a ciphertext, and transmitting the generated ciphertext to the receiving terminal; and receiving, by the receiving terminal, the ciphertext and the private key, and decrypting the ciphertext based on the received private key to obtain a message.

The setting of at least one public parameter and master key, by the key generation server, may include: receiving a security constant from the outside, arbitrarily selecting a first generator and a second generator among generators belonging to an elliptical curve group having the security constant as an input value, and selecting an arbitrary element among elements belonging to the elliptical curve group; selecting an arbitrary random number and setting as a master key; calculating a function value by applying the first generator, the second generator and the master key to a bilinear function; and setting a public parameter including at least one of the first generator, the second generator, the arbitrary element and the function value of the bilinear function.

The generating of a private key and transmitting of the generated private key to the receiving terminal, by the key generation server, may include: arbitrarily selecting a first random number; generating a first private key based on the second generator, the master key, the arbitrary element and the first random number; generating a second private key based on the first generator and the first random number; hashing the first private key and the second private key to generate a first tag value; generating a third private key based on the value obtained by hashing the ID, the arbitrary element, the first tag value and the first random number; and generating a private key including the first private key, the second private key and the third private key and transmitting the private key to the receiving terminal.

The encrypting of a message to generate a ciphertext, by the transmitting terminal, may include: arbitrarily selecting a second random number; generating a first ciphertext based on the function value of the bilinear function, the second random number and the message; generating a second ciphertext based on the first generator and the second random number; hashing the first ciphertext and the second ciphertext to generate a second tag value; generating a third ciphertext based on the value obtained by hashing the ID, the arbitrary element, the second tag value and the second random number; and generating a ciphertext including the first ciphertext, the second ciphertext and the third ciphertext and transmitting the ciphertext to the receiving terminal.

The decrypting of the ciphertext to obtain a message, by the receiving terminal, may include: hashing the first private key and the second private key among private keys received from the key generation server to calculate a first tag value; hashing the first ciphertext and the second ciphertext among ciphertexts received from the transmitting terminal to calculate a second tag value; determining whether the first tag value is identical to the second tag value; determining whether the function value of the bilinear function to which the values obtained by hashing the second ciphertext and the ID, the arbitrary element and the calculated second tag value are applied is identical to a function value of a bilinear function to which the first generator and the third ciphertext are applied; calculating a decrypting parameter based on the function value of the bilinear function to which the second ciphertext and the first private key are applied, the function value of the bilinear function to which the second ciphertext and the third private key are applied, the function value of the bilinear function to which the second private key and the third ciphertext are applied, the first tag value and the second tag value; and splitting the first ciphertext by the decrypting parameter to obtain a message.

In another aspect, there is provided a public encryption method based on user ID, which includes: setting, by a key generation server, at least one public parameter and master key used for generating a private key; receiving, by the key generation server, an inherent ID of a user from a receiving terminal, generating a private key based on the public parameter, the master key and the ID, and transmitting the generated private key to the receiving terminal; generating, by a transmitting terminal, a session key based on the public parameter, encrypting a message based on the generated session key, and then generating a ciphertext; and receiving, by the receiving terminal, the generated ciphertext, calculating a session key, and then decrypting the ciphertext based on the generated session key to obtain a message.

The setting of at least one public parameter and master key, by the key generation server, may include: receiving a security constant from the outside, arbitrarily selecting a first generator and a second generator among generators belonging to an elliptical curve group having the security constant as an input value, and selecting an arbitrary element among elements belonging to the elliptical curve group; selecting an arbitrary random number and setting as a master key; calculating a function value by applying the first generator, the second generator and the master key to a bilinear function; and setting a public parameter including at least one of the first generator, the second generator, the arbitrary element and the function value of the bilinear function.

The generating of a private key and transmitting of the generated private key to the receiving terminal, by the key generation server, may include: arbitrarily selecting a first random number; generating a first private key based on the second generator, the master key, the arbitrary element and the first random number; generating a second private key based on the first generator and the first random number; hashing the first private key and the second private key to generate a first tag value; generating a third private key based on the value obtained by hashing the ID, the arbitrary element, the first tag value and the first random number; and generating a private key including the first private key, the second private key and the third private key and transmitting the private key to the receiving terminal.

The generating of a ciphertext based on the session key, by the transmitting terminal, may include: arbitrarily selecting a second random number; generating a session key based on the function value of the bilinear function and second random number; generating a fourth ciphertext by applying the session key and the message to a symmetric-key algorithm; generating a second tag value based on the fourth ciphertext, the first generator and the second random number; and generating a ciphertext based on the first generator, the second random number, the value obtained by hashing the ID, the arbitrary element and the second tag value.

The decrypting of the ciphertext based on the session key to obtain a message, by the receiving terminal, may include: hashing the first private key and the second private key among private keys received from the key generation server to calculate a first tag value; hashing the fourth ciphertext and the second ciphertext among ciphertexts received by the transmitting terminal to calculate a second tag value; determining whether the first tag value is identical to the second tag value; calculating a decrypting parameter based on the function value of the bilinear function to which the second ciphertext and the first private key are applied, the function value of the bilinear function to which the second ciphertext and the third private key are applied, the function value of the bilinear function to which the second private key and the third ciphertext are applied, the first tag value and the second tag value; applying the decrypting parameter to a symmetric-key cipher algorithm to obtain a session key; and applying the session key and the fourth ciphertext to a symmetric-key algorithm to obtain a message.

The public encryption method based on user ID according to the present disclosure may allow efficient communication by using an inherent ID of a user as a public key, since a process for certifying the public key through a trusted third party is not needed.

In addition, the public encryption method based on user ID according to the present disclosure may reduce time and costs required for continuously maintaining or managing a discarded certificate list, since a certificate for a public key through a trusted third party is not used.

Moreover, the public encryption method based on user ID according to the present disclosure may allow the identity of a user, who is to perform communication, to be easily checked by checking a public key, since the ID of the user is used as the public key.

Further, the public encryption method based on user ID according to the present disclosure may reduce time and costs required for constructing a public key structure since a complicated PKI (Public Key Infrastructure) need not be constructed.

[Detailed Description of Main Elements]

| | |
|---|---|
| 120: key generation server | 140: transmitting terminal |
| 160: receiving terminal | |

DETAILED DESCRIPTION OF EMBODIMENTS

Hereinafter, embodiments of the present disclosure will be described in detail with reference to the accompanying drawings so that a person skilled in the art can easily implement the present disclosure. However, the present disclosure may be implemented in various ways, without being limited to the embodiments herein.

Figure 1:
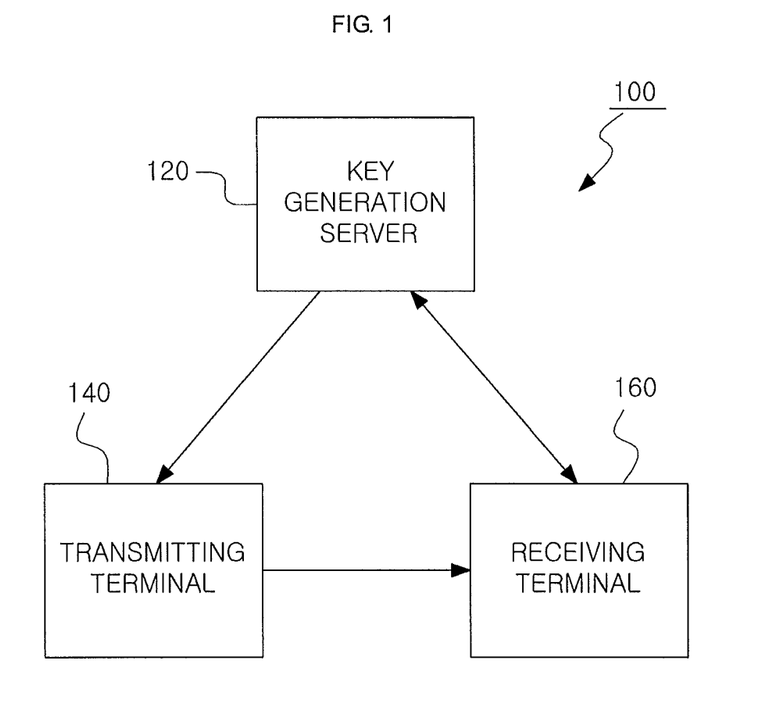
FIG. 1 is a block diagram showing a system for implementing a public encryption method based on user ID according to an embodiment of the present disclosure.

FIG. 1 is a block diagram showing a system for implementing a public encryption method based on user ID according to an embodiment of the present disclosure.

As shown in FIG. 1, a for implementing the public encryption method based on user ID according to the present disclosure includes a key generation server 120, a transmitting terminal 140 and a receiving terminal 160.

The key generation server 120 sets at least one public parameter and master key used for generating a private key. In detail, the key generation server 120 receives a security constant from the outside, arbitrarily selects a first generator and a second generator among generators belonging to an elliptical curve group having the security constant as an input value, selects an arbitrary element among elements belonging to the elliptical curve group, selects an arbitrary random number and sets as a master key, calculates a function value by applying the first generator, the second generator and the master key to a bilinear function, and sets a public parameter including at least one of the first generator, the second generator, the arbitrary element and the function value of the bilinear function.

In addition, the key generation server 120 receives an inherent ID of a user from a receiving terminal 160, generates a private key based on the public parameter, the master key and the ID, and transmits the generated private key to the receiving terminal 160. In other words, the key generation server 120 arbitrarily selects a first random number, generates a first private key based on the second generator, the master key, the arbitrary element and the first random number, generates a second private key based on the first generator and the first random number, hashes the first private key and the second private key to generate a first tag value, generates a third private key based on the value obtained by hashing the ID, the arbitrary element, the first tag value and the first random number, and generates a private key including the first private key, the second private key and the third private key and transmits the private key to the receiving terminal 160.

The transmitting terminal 140 receives the public parameter and the ID from the key generation server 120, encrypts a message to generate a ciphertext, and transmits the generated ciphertext to the receiving terminal. In detail, the transmitting terminal 140 arbitrarily selects a second random number, generates a first ciphertext based on the function value of the bilinear function, the second random number and the message, generates a second ciphertext based on the first generator and the second random number, hashes the first ciphertext and the second ciphertext to generate a second tag value, generates a third ciphertext based on the value obtained by hashing the ID, the arbitrary element, the second tag value and the second random number, and generates a ciphertext including the first ciphertext, the second ciphertext and the third ciphertext and transmits the ciphertext to the receiving terminal 160.

The receiving terminal 160 receives the ciphertext and the private key and decrypts the ciphertext based on the received private key to obtain a message. In detail, the receiving terminal 160 hashes the first private key and the second private key among private keys received from the key generation server 120 to calculate a first tag value, hashes the first ciphertext and the second ciphertext among ciphertexts received from the transmitting terminal 140 to calculate a second tag value, determines whether the first tag value is identical to the second tag value, determines whether the function value of the bilinear function to which the values obtained by hashing the second ciphertext and the ID, the arbitrary element and the calculated second tag value are applied is identical to a function value of a bilinear function to which the first generator and the third ciphertext are applied, calculates a decrypting parameter based on the function value of the bilinear function to which the second ciphertext and the first private key are applied, the function value of the bilinear function to which the second ciphertext and the third private key are applied, the function value of the bilinear function to which the second private key and the third ciphertext are applied, the first tag value and the second tag value, and splits the first ciphertext by the decrypting parameter to obtain a public key.

Hereinafter, the public encryption method based on user ID according to the present disclosure will be described in detail with reference to FIG. 2.

Figure 2:
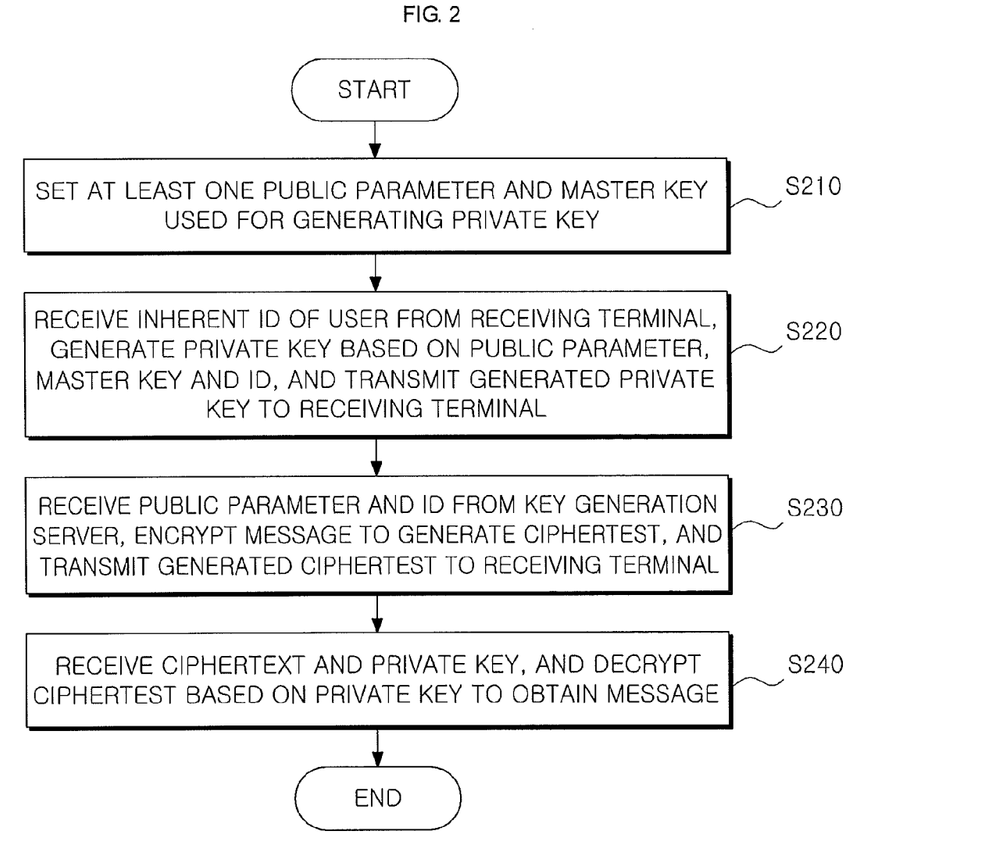
FIG. 2 is a flowchart for illustrating a public encryption method based on user ID according to another embodiment of the present disclosure.

FIG. 2 is a flowchart for illustrating a public encryption method based on user ID according to another embodiment of the present disclosure.

As shown in FIG. 2, in the public encryption method based on user ID according to the present disclosure, first, the key generation server 120 sets at least one public parameter and master key used for generating a private key (S210).

After that, the key generation server 120 receives an inherent ID of a user from the receiving terminal 160, generates a private key based on the public parameter, the master key and the ID, and transmits the generated private key to the receiving terminal 160 (S220).

Subsequently, the transmitting terminal 140 receives the public parameter and the ID from the key generation server 120, encrypts a message to generate a ciphertext, and transmits the generated ciphertext to the receiving terminal 160 (S230).

Accordingly, the receiving terminal 160 receives the ciphertext and the private key, and decrypts the ciphertext based on the received private key to obtain a message (S240).

Hereinafter, each operation of the above method will be described in detail with reference to FIGS. 3 to 6.

Figure 3:
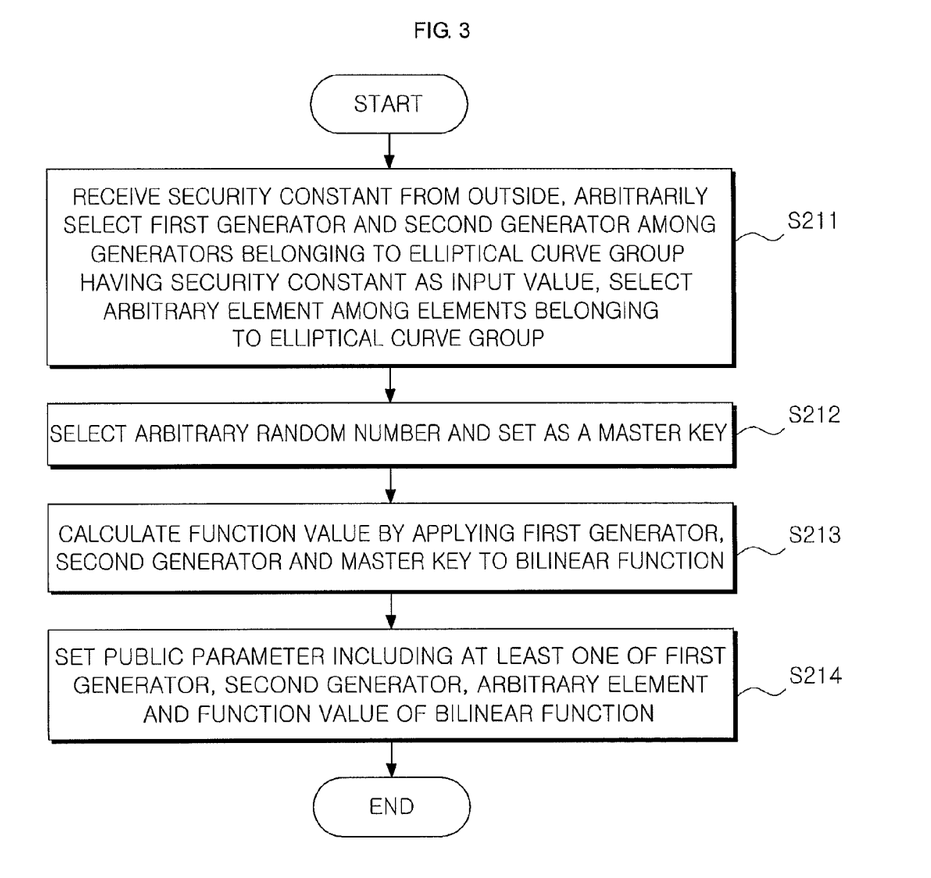
FIG. 3 is a flowchart for illustrating a detailed procedure of the operation for setting a public parameter and a master key, depicted in FIG. 2.

FIG. 3 is a flowchart for illustrating a detailed procedure of the operation for setting a public parameter and a master key.

First, $G, \hat{G}$ used in the present disclosure represents a cyclic group having a prime number p as an order, and $G, \hat{G}$ represents a generator in each elliptical curve group.

As shown in FIG. 3, the key generation server 120 receives a security constant $\lambda \in Z^+$ from the outside, arbitrarily selects a first generator $g \in G$ and a second generator $\hat{g} \in \hat{G}$ among generators belonging to an elliptical curve group $G, \hat{G}$ having an order of p with the security constant $\lambda$ as an input value, and selects an arbitrary element $\hat{u} \in \hat{G}$, among elements belonging to the elliptical curve group (S211).

In addition, the key generation server 120 selects a cryptographic hash function $H_1: \{0,1\}^* \to \hat{G}$, $H_2: \{0,1\}^* \to Z_p$.

Subsequently, the key generation server 120 arbitrarily selects a random number $\alpha \in Z_p$ and sets the random number as a master key msk=$\alpha \in Z_p$ (S212).

After that, the key generation server 120 applies the first generator g, the second generator $\hat{g}$, the master key $\alpha$ and the bilinear function $e: G \times \hat{G} \to G_t$, selected above, the Equation 1 below to calculate a function value of a bilinear function (S213).

$$A = e(g, \hat{g})^\alpha \quad \text{Equation 1}$$

Accordingly, the key generation server 120 sets a public parameter params=$(g, \hat{g}, \hat{u}, A) \in G \times \hat{G}^2 \times G_t$ including at least one of the first generator g, the second generator $\hat{g}$ and the arbitrary element $\hat{u}$, selected in Operation S211, and the function value A of the bilinear function, calculated in Operation S213 (S214).

Figure 4:
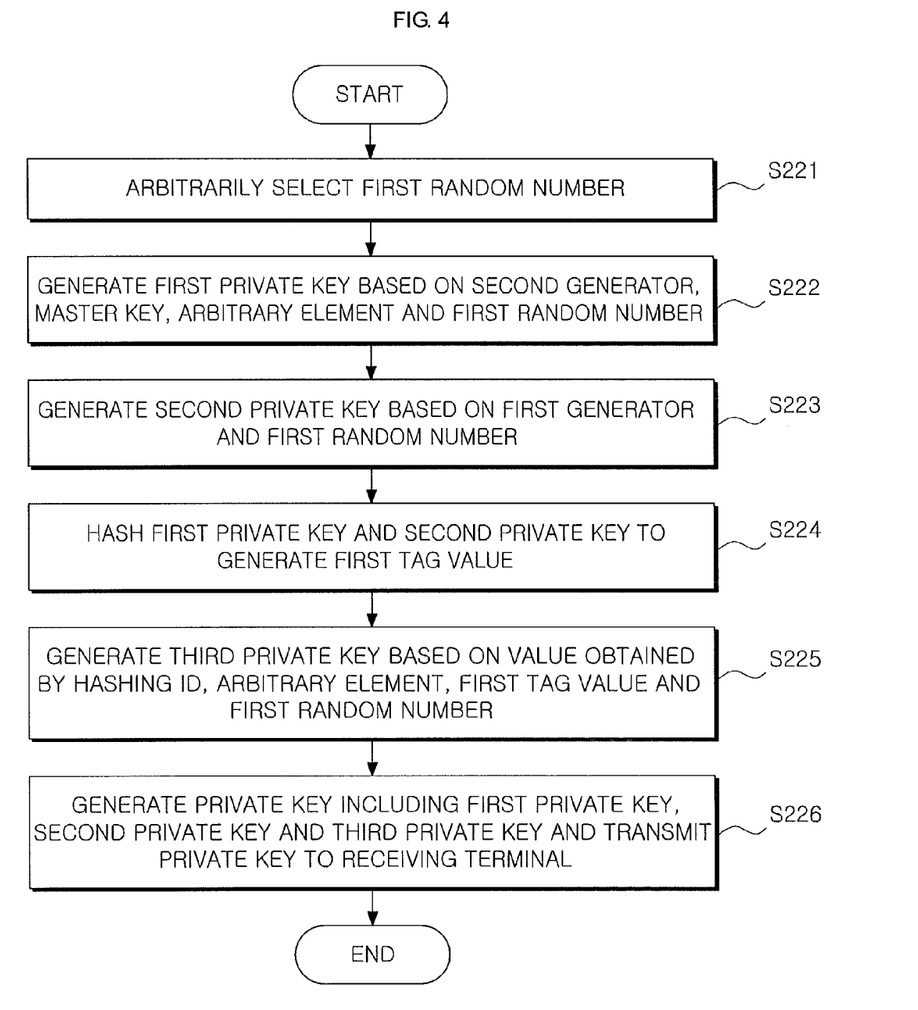
FIG. 4 is a flowchart for illustrating a detailed procedure of the private key generating operation, depicted in FIG. 2.

FIG. 4 is a flowchart for illustrating a detailed procedure of the private key generating operation.

As shown in FIG. 4, as the public parameter and the master key are set as described above, the key generation server 120 selects a first random number r∈$Z_p$ (S221).

After that, the key generation server 120 applies the second generator ĝ, the master key α, the arbitrary element û, and the first random number r selected in Operation S221 to Equation 2 below to generate a first private key $d_0$ among all private keys for encrypting the public key (S222).

$$d_0 = ĝ^α û^r \qquad \text{Equation 2}$$

In addition, the key generation server 120 applies the first generator g and the first random number r to Equation 3 below to generate a second private key $d_1$ (S223).

$$d_1 = g^r \qquad \text{Equation 3}$$

Subsequently, the key generation server 120 hashes the first private key $d_0$ generated in Operation S222 and the second private key $d_1$ generated in Operation S223 like Equation 4 below to generate a first $tag_k$ value (S224).

$$tag_c = H_2(c_0, c_1) \in Z_p \qquad \text{Equation 4}$$

The key generation server 120 applies the value obtained by hashing the ID id of the receiving terminal 160, the arbitrary element û, the first tag value $tag_k$ and the first random number r to Equation 5 below to generate a third private key $d_2$.

$$d_2 = (H_1(id) û^{tag_k})^r \qquad \text{Equation 5}$$

Accordingly, the key generation server 120 generates a private key $d_{id} = (d_0, d_1, d_2)$ including the first private key $d_0$, the second private key $d_1$ and the third private key $d_2$ and transmits the private key to the receiving terminal 160 (S226).

Figure 5:
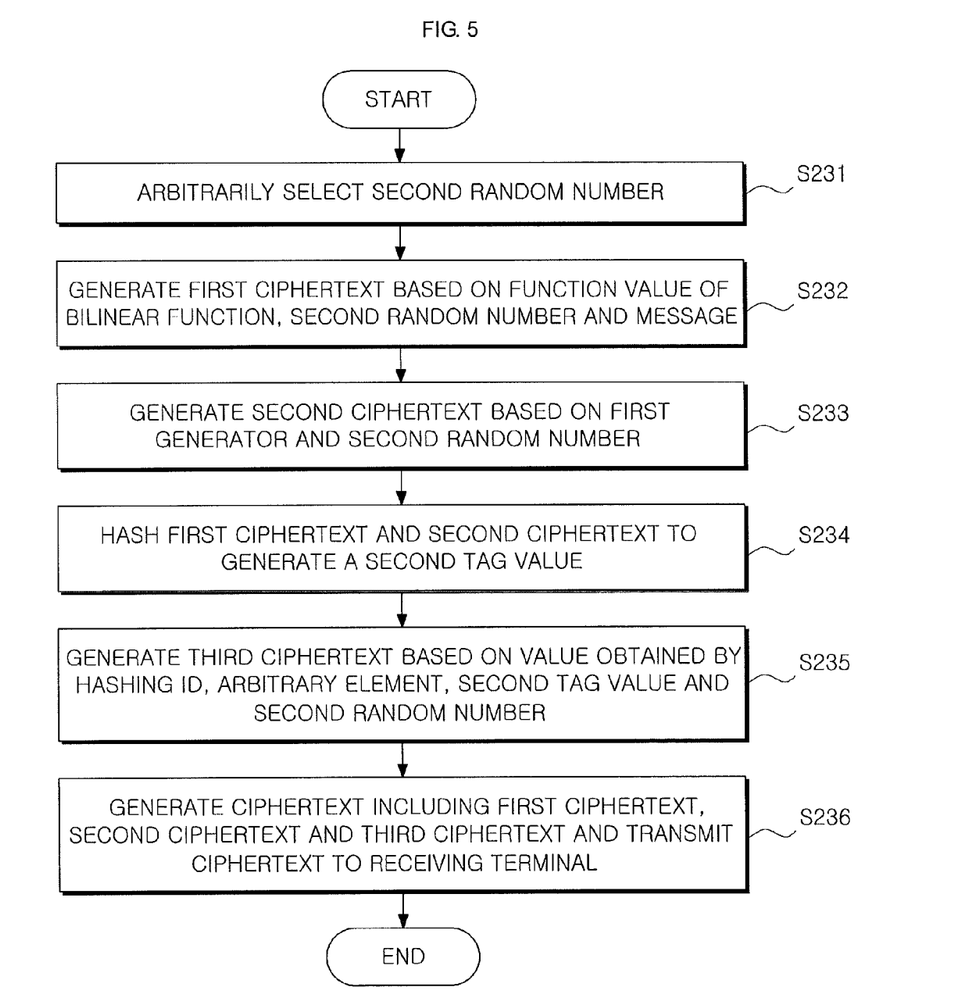
FIG. 5 is a flowchart for illustrating a detailed procedure of the operation for generating a ciphertext for a message, depicted in FIG. 2.

FIG. 5 is a flowchart for illustrating a detailed procedure of the operation for generating a ciphertext for a public key.

As shown in FIG. 5, the transmitting terminal 140 arbitrarily selects a second random number s∈$Z_p$ (S231).

After that, the transmitting terminal 140 applies the function value A of the bilinear function calculated in the public parameter and master key setting operation, the second random number s selected in Operation S231, and the message M, to Equation 6 below to generate a first ciphertext $c_0$ among all ciphertexts of the message M, (S232).

$$c_0 = A^s \cdot M, \qquad \text{Equation 6}$$

In addition, the transmitting terminal 140 applies the first generator g selected in the public parameter and master key setting operation and the second random number s selected in Operation S231 to Equation 7 below to generate a second ciphertext $c_1$ (S233).

$$c_1 = g^s \qquad \text{Equation 7}$$

After that, the transmitting terminal 140 hashes the first ciphertext $c_0$ generated in Operation S232 and the second ciphertext $c_1$ generated in Operation S233 like Equation 8 below to generate a second tag value $tag_c$ (S234).

$$tag_c = H_2(c_0, c_1) \in Z_p \qquad \text{Equation 8}$$

Subsequently, the transmitting terminal 140 applies the value obtained by hashing the ID id of the receiving terminal 160, the arbitrary element û, the second tag value $tag_c$ and the second random number s to Equation 9 below to generate a third ciphertext $c_2$ (S235).

$$c_2 = (H_1(id) û^{tag_c})^s \qquad \text{Equation 9}$$

After that, the transmitting terminal 140 generates all ciphertexts $c_{id} = (c_0, c_1, c_2) \in G_t \times G \times Ĝ$ for the message M, including the first ciphertext $c_0$ generated in Operation S232, the second ciphertext $c_1$ generated in Operation S233 and the third ciphertext $c_2$ generated in Operation S232 and transmits the ciphertexts to the receiving terminal 160.

Figure 6:
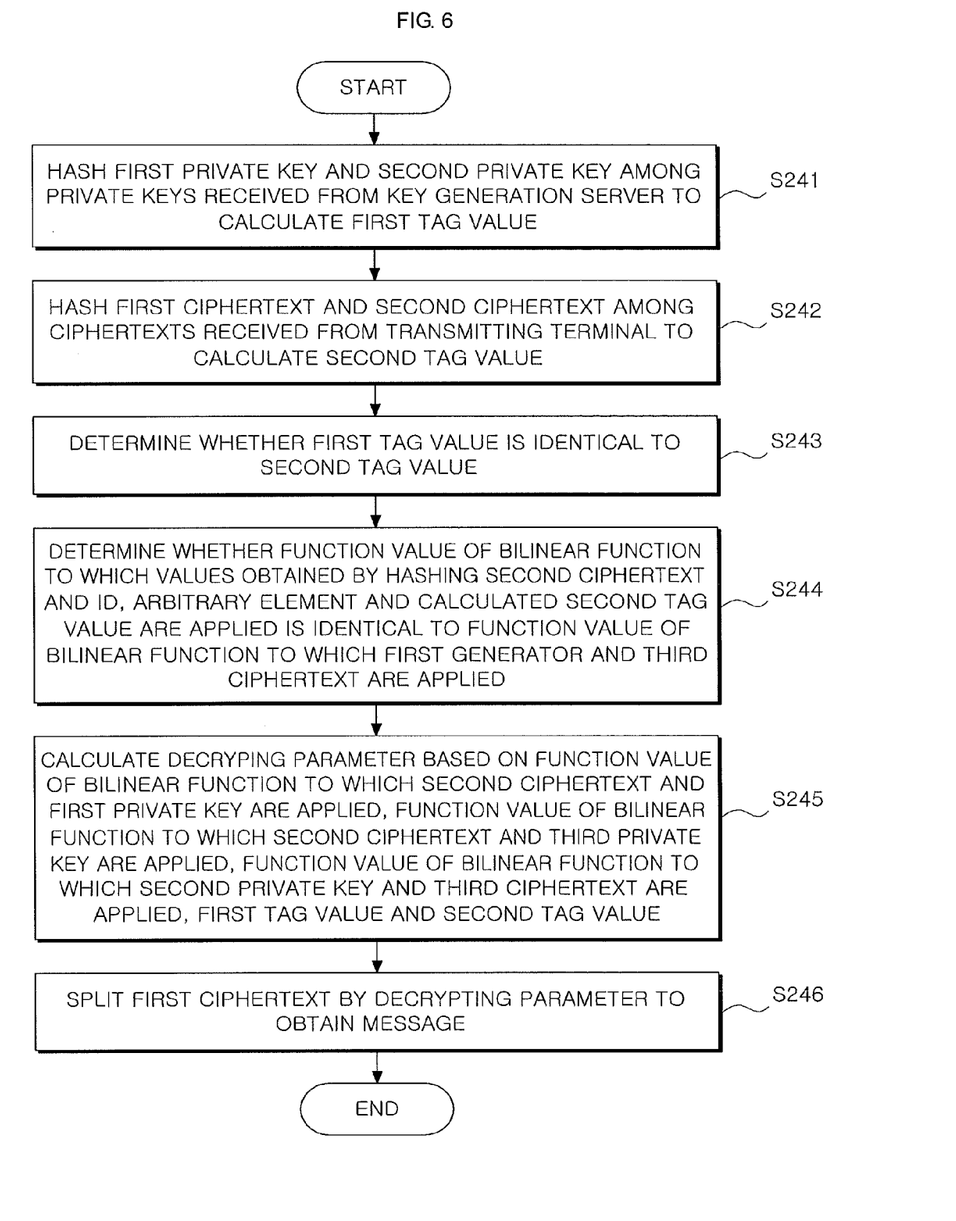
FIG. 6 is a flowchart for illustrating a detailed procedure of the ciphertext decrypting operation, depicted in FIG. 2.

FIG. 6 is a flowchart for illustrating a detailed procedure of the ciphertext decrypting operation.

As shown in FIG. 6, first, the receiving terminal 160 hashes the first private key $d_0$ and the second private key $d_1$ among private keys $d_{id} = (d_0, d_1, d_2)$ received from the key generation server 120 like Equation 4 below to calculate a first tag value $tag_k$ (S241).

$$tag_k = H_2(d_0, d_1) \qquad \text{Equation 4}$$

In addition, the receiving terminal 160 hashes the first ciphertext $c_0$ and the second ciphertext $c_1$ among ciphertexts $c_{id} = (c_0, c_1, c_2)$ received from the transmitting terminal 140 like Equation 8 below to calculate a second tag value $tag_c$ (S242).

$$tag_c = H_2(c_0, c_1) \qquad \text{Equation 8}$$

After that, the receiving terminal 160 determines whether the first tag value $tag_k$ calculated in Operation S241 is identical to the second tag value $tag_c$ calculated in Operation S242 (S243).

If the first tag value $tag_k$ is identical to the second tag value $tag_c$, it is determined that decrypting the ciphertext for the public key is failed.

However, if the first tag value $tag_k$ is different from the second tag value $tag_c$, like Equation 10 below, the receiving terminal 160 determines whether the function value of the bilinear function e to which the value obtained by hashing the ID id of the second ciphertext $c_1$, the arbitrary element û, and the calculated second tag value $tag_c$ are applied is identical to a function value of a bilinear function e to which the first generator g and the third ciphertext $c_2$ are applied (S244).

$$e(c_1, H_1(id) û^{tag_c}) \stackrel{?}{=} e(g, c_2) \qquad \text{Equation 10}$$

At this time, if the function value of the bilinear function e to which the value obtained by hashing the ID id of the second ciphertext $c_1$, the arbitrary element û, and the calculated second tag value $tag_c$ are applied is not identical to the function value of the bilinear function e to which the first generator g and the third ciphertext $c_2$ are applied, it is determined that decrypting the ciphertext for the message is failed.

After that, the receiving terminal 160 applies the function value of the bilinear function e to which the second ciphertext $c_1$ and the first private $d_0$ key are applied, the function value of the bilinear function e to which the second private key $d_1$ and the third ciphertext $c_2$ are applied, the function value of the bilinear function e to which the second ciphertext $c_1$ and the third private key $d_2$ are applied, the first tag value $tag_k$ and the second tag value $tag_c$ to Equation 11 below to calculate a decrypting parameter x.

$$x = \left( \frac{1}{e(c_1, d_0)} \cdot \left( \frac{e(d_1, c_2)}{e(c_1, d_2)} \right)^{\frac{1}{tag_c - tag_k}} \right) \qquad \text{Equation 11}$$

Accordingly, the receiving terminal 160 obtains a message M by splitting the first ciphertext $c_0$ by the decrypt parameter x.

In addition, regarding the encryption of a public key by using a user ID as described above, a method for encrypting a message by encapsulating a session key will be described in detail.

Figure 7:
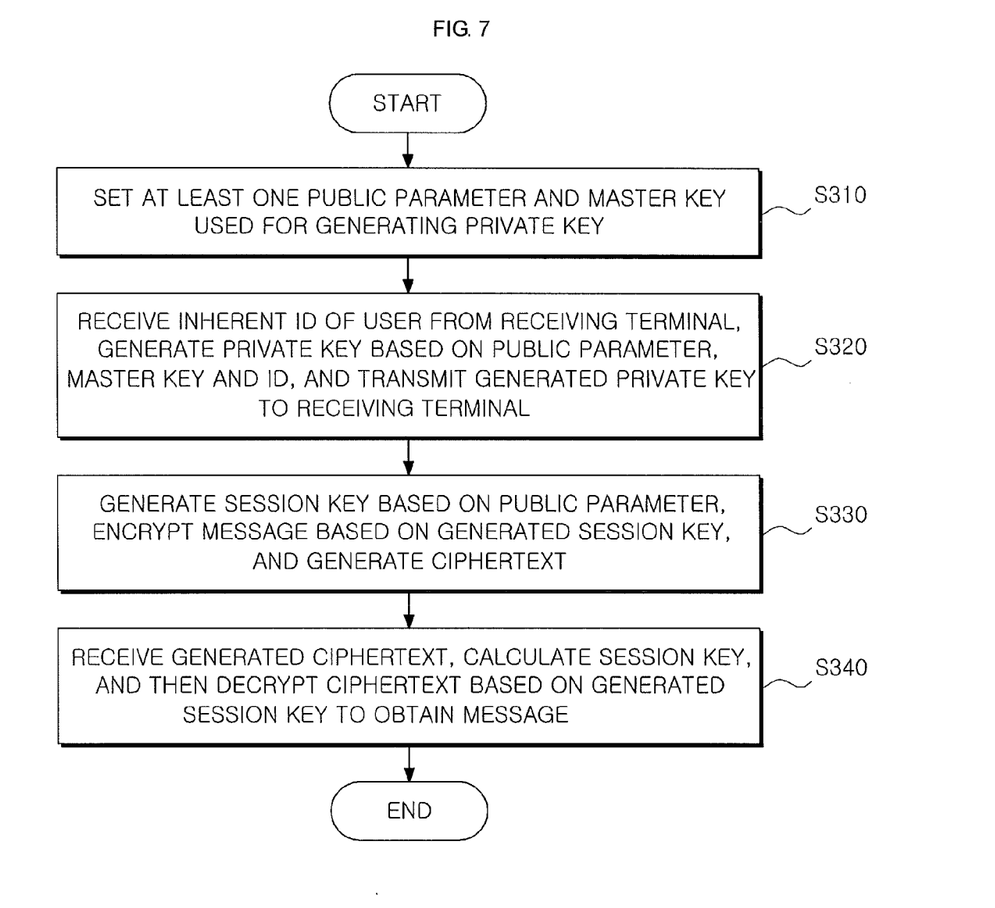
FIG. 7 is a flowchart for illustrating a public encryption method based on user ID according to another embodiment of the present disclosure.

FIG. 7 is a flowchart for illustrating a public encryption method based on user ID according to another embodiment of the present disclosure.

As shown in FIG. 7, in the public encryption method based on user ID according to the present disclosure, first, the key generation server 120 sets at least one public parameter and master key used for generating a private key (S310).

Subsequently, the key generation server 120 receives an inherent ID of a user from the receiving terminal 160, generates a private key based on the public parameter, the master key and the ID, and transmits the generated private key to the receiving terminal 160 (S320).

After that, the transmitting terminal 140 generates a session key based on the public parameter, encrypts a message based on the generated session key, and then generates a ciphertext (S330).

Therefore, the receiving terminal 160 receives the generated ciphertext, calculates a session key, and then decrypts the ciphertext based on the generated session key to obtain a message (S340).

Hereinafter, with reference to FIGS. 8 and 9, the public encryption method based on user ID according to another embodiment of the present disclosure will be described in detail.

In particular, the operations for the key generation server 120 to set a public parameter and a master key and generate a private key are identical to the above description depicted in FIGS. 3 and 4, and thus are not described in detail here.

Figure 8:
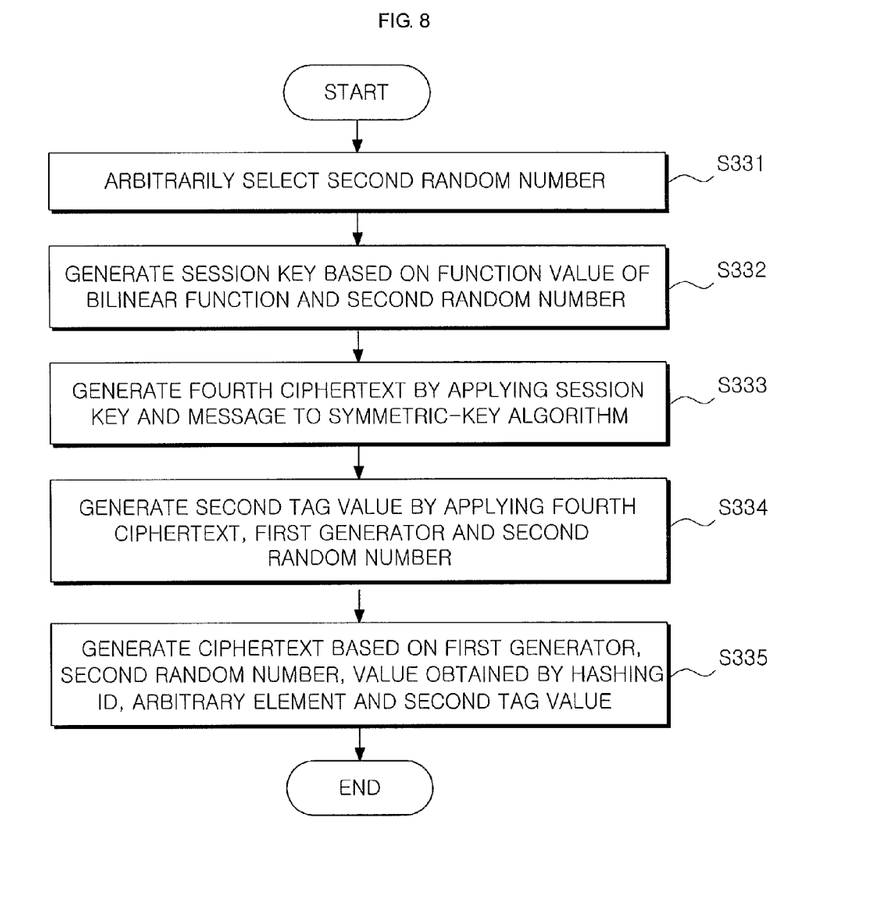
FIG. 8 is a flowchart for illustrating a detailed procedure of the operation for encrypting a message with a session key, depicted in FIG. 7.

FIG. 8 is a flowchart for illustrating a detailed procedure of the operation for encrypting a message with a session key.

As shown in FIG. 8, the transmitting terminal 140 arbitrarily selects a second random number $s \in Z_p$ (S331).

Subsequently, the transmitting terminal 140 applies the function value A of the bilinear function calculated in the public parameter and master key setting operation and the second random number s selected in Operation S331 to Equation 7 below to generate a session key K (S332).

$$K = A^s \in G_t \quad \text{Equation 7}$$

After that, the transmitting terminal 140 applies the calculated session key K and the message M to a symmetric-key algorithm like Equation 13 below to calculate a fourth ciphertext (S333).

$$C_M = \text{SymEnc}(K, M) \quad \text{Equation 13}$$

Subsequently, the transmitting terminal 140 hashes the fourth ciphertext $C_M$, the first generator g and the second random number s like Equation 14 below to generate a second tag value $tag_c$ (S334).

$$tag_c = H_2(C_M, g^s) \quad \text{Equation 14}$$

Accordingly, the transmitting terminal 140 applies the first generator g, the second random number s, the value obtained by hashing the ID id, the arbitrary element û and the second tag value $tag_c$ to Equation 15 below to generate a ciphertext $C_{id}$ (S335).

$$C_{id} = (C_M, C_1, C_2) = (G_M, g^s, (H_1(id)\hat{u}^{tag_c})^s) \quad \text{Equation 15}$$

Figure 9:
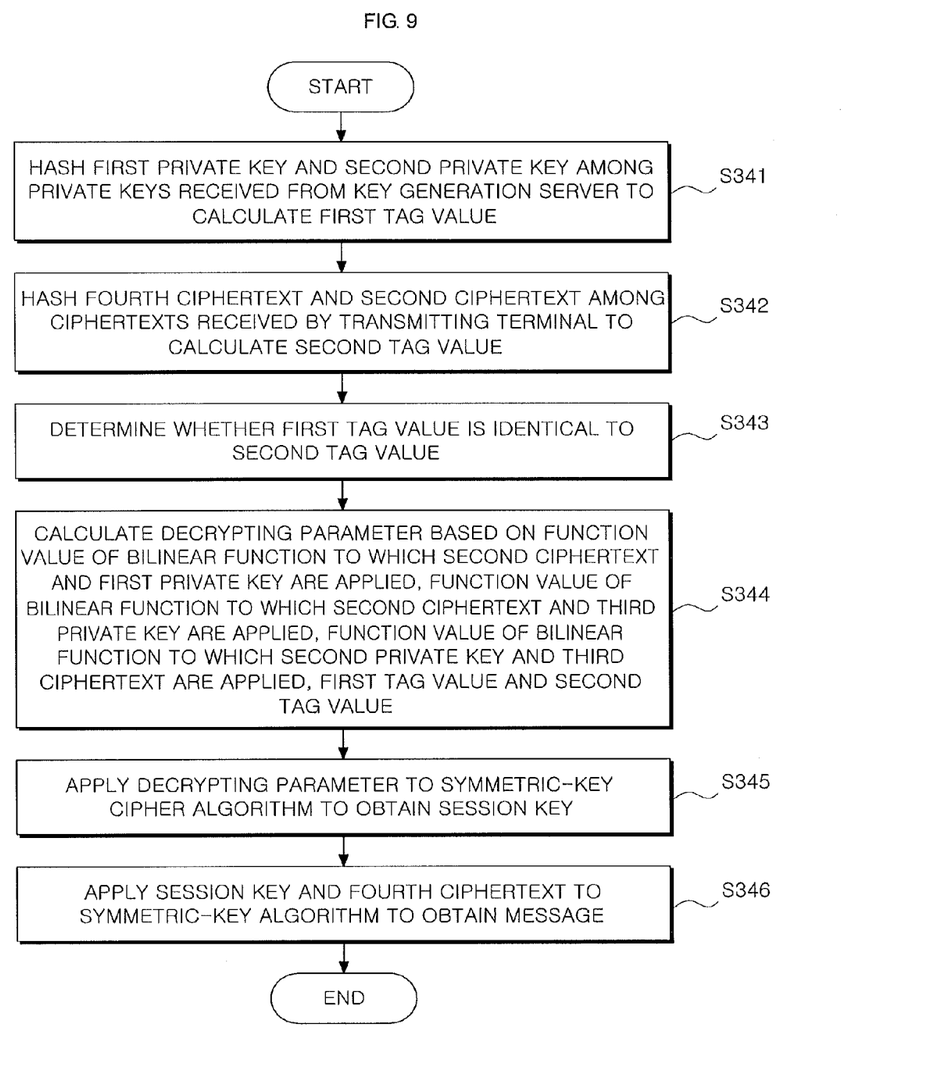
FIG. 9 is a flowchart for illustrating a detailed procedure of the operation for decrypting a ciphertext with a session key, depicted in FIG. 7.

FIG. 9 is a flowchart for illustrating a detailed procedure of the operation for decrypting a ciphertext with a session key.

As shown in FIG. 9, the receiving terminal 160 hashes the first private key $d_0$ and the second private key $d_1$ among private keys $d_{id} = (d_0, d_1, d_2)$ received from the key generation server 120 like Equation 4 below to calculate a first tag value $tag_k$ (S341).

$$tag_k = H_2(d_0, d_1) \quad \text{Equation 4}$$

The receiving terminal 160 hashes the fourth ciphertext $C_M$ and the second ciphertext $c_1$ among ciphertexts $C_{id} = (C_M, C_1, C_2)$ received from the transmitting terminal 140 like Equation 8 below to calculate a second tag value $tag_c$ (S342).

$$tag_c = H_2(C_M, C_1) \quad \text{Equation 8}$$

The receiving terminal 160 determines whether the first tag value $tag_k$ is identical to the second tag value $tag_c$ (S343).

At this time, if the first tag value $tag_k$ is identical to the second tag value $tag_c$, it is determined that decrypting the ciphertext for the public key is failed.

However, if the first tag value $tag_k$ is not identical to the second tag value $tag_c$, the receiving terminal 160 applies the function value of the bilinear function e to which the second ciphertext $c_1$ and the first private key $d_0$ are applied, the function value of the bilinear function e to which the second private key $d_1$ and the third ciphertext $c_2$ are applied, the function value of the bilinear function e to which the second ciphertext $c_1$ and the third private key $d_2$ are applied, the first tag value $tag_k$ and the second tag value $tag_c$ to Equation 11 below to calculate a decrypting parameter x (S344).

$$x = \left( \frac{1}{e(c_1, d_0)} \cdot \left( \frac{e(d_1, c_2)}{e(c_1, d_2)} \right)^{\frac{1}{tag_c - tag_k}} \right) \quad \text{Equation 11}$$

Accordingly, the receiving terminal 160 obtains a session key K by applying the calculated decrypting parameter x to a symmetric-key cipher algorithm (S345).

The receiving terminal 160 applies the session key K and the fourth ciphertext $C_M$ to a symmetric-key algorithm to obtain a message M (S346).

Seeing main features of the public encryption method based on user ID according to the present disclosure, it may be understood that the ID of a user is not combined with a master private key.

In particular, when comparing structures of the ciphertext and the private key, it may be found that the second private key $d_1 = (H_1(id)\hat{u}^{tag_k})^r$ and the third ciphertext $c_2 = (H_1(id)\hat{u}^{tag_c})^s$ have the same structure.

Accordingly, in the present disclosure, even though the private key and the ciphertext have the same ID in the public key decrypting operation, since $1/tag_c - tag_k$ is operated only when the first tag value $tag_k$ is not identical to the second tag value $tag_c$, a normal message M may be calculated only when the first tag value $tag_k$ used in generating a private key is different from the second tag value $tag_c$ used in operating a ciphertext.

Figure 10:
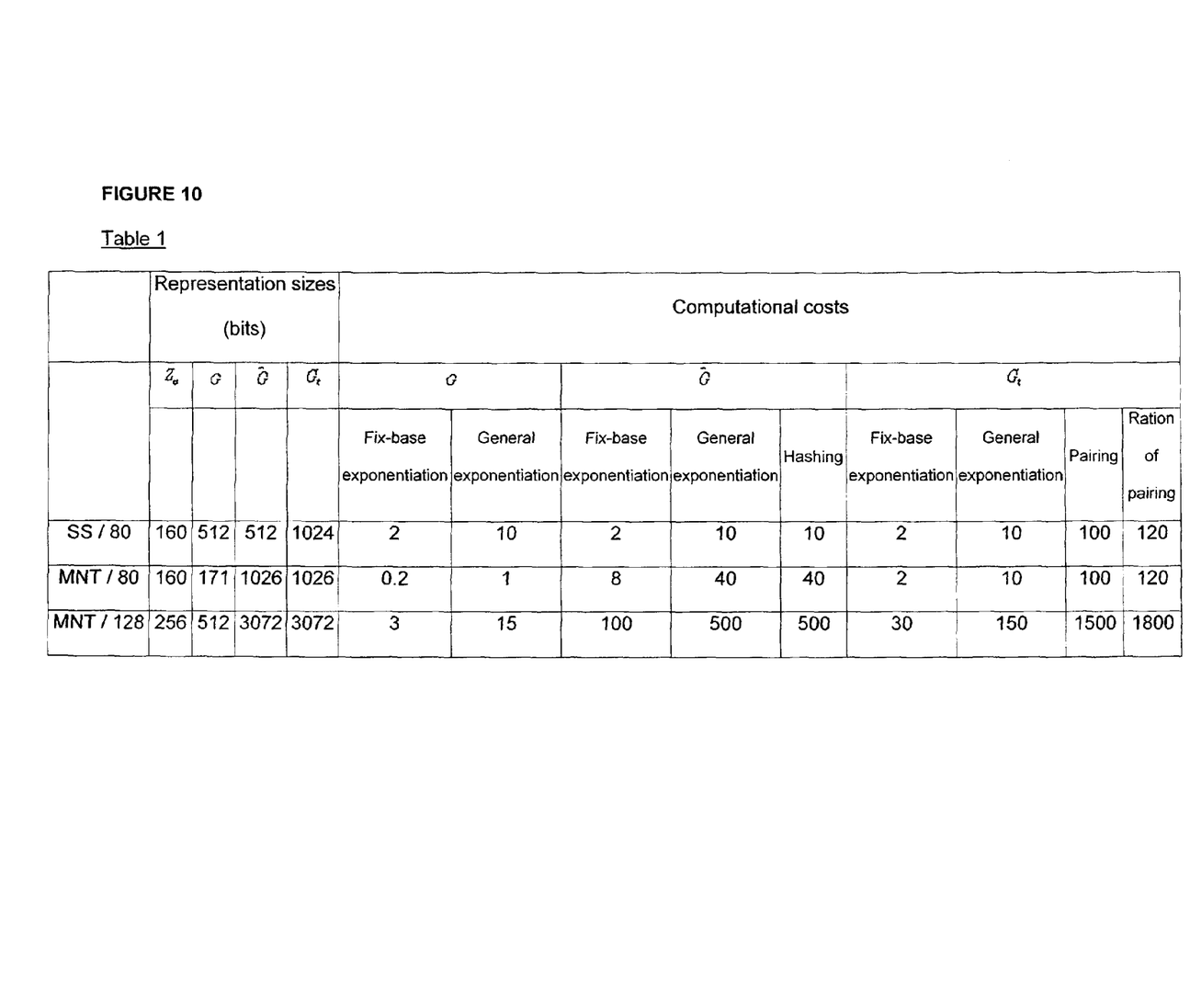
FIG. 10 is a table which shows the computational costs of the present disclosure.

Hereinafter, computational costs of the present disclosure and an existing technique will be described with reference to Table 1 in FIG. 10.

In order to check the computational costs determining criterion of the present disclosure and the existing technique, depending on the kind and security level of oval curves, SS80 (a supersingular oval curve having a bit security level), MNT80 (an MNT oval curve having a bit security level of 80), and MNT128 (an MNT oval curve having a bit security level of 128) have been put into consideration.

Computational costs vary depending on exponentiation, the number of operations of a bilinear function, and the operation of a hash function having an oval curve group as a range. The exponentiation may be more efficiently computed through pre-operation if the base is always fixed, in comparison to general exponentiation. In addition, the operation of a bilinear function forms a greatest part in the overall computational costs, and the computational costs may be performed efficiently since the ratio of two bilinear maps is operated relatively few, for example once or twice, between bilinear functions.

Figure 11:
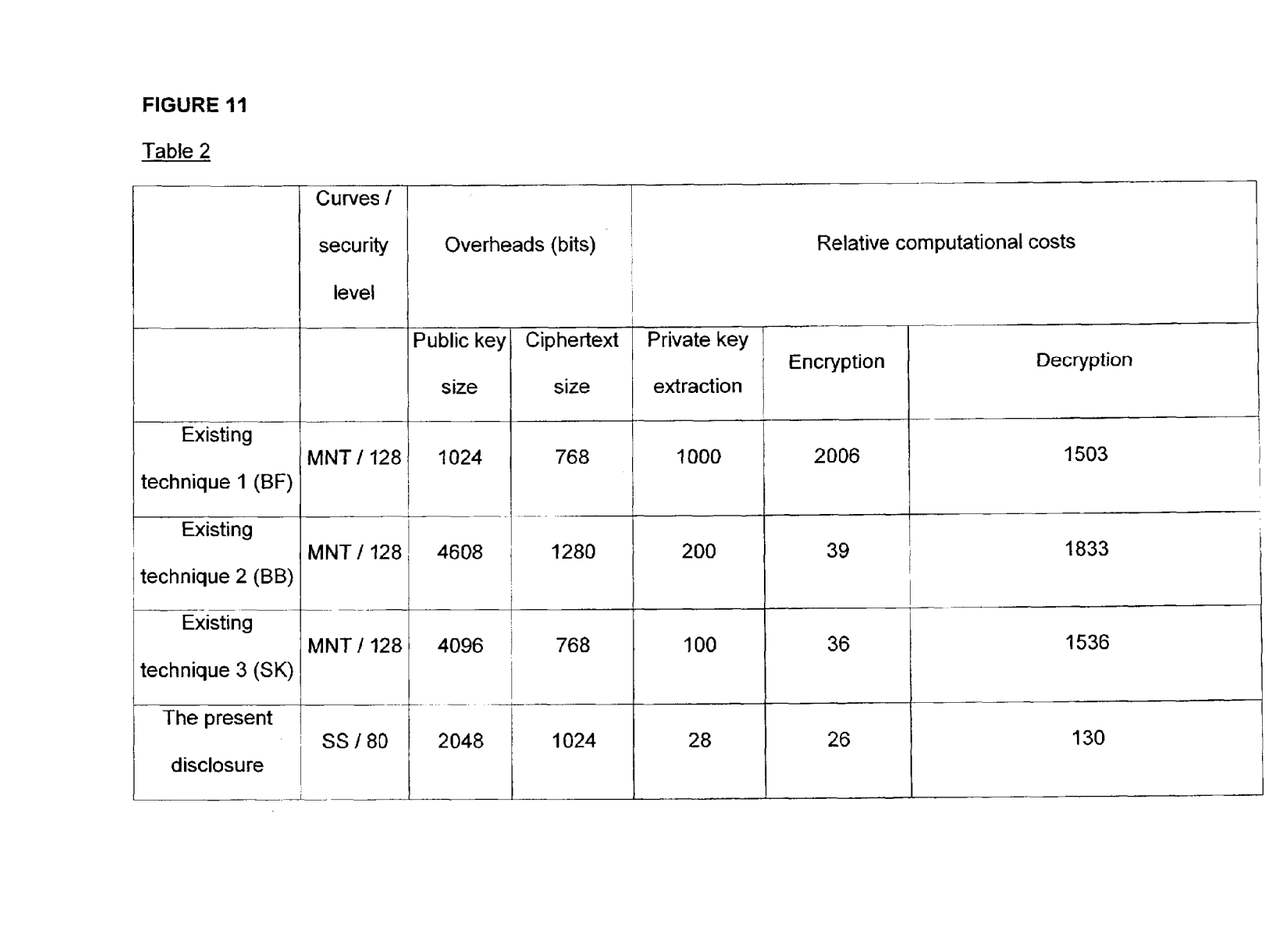
FIG. 11 is a table which shows efficiency comparison of computation between the present disclosure and existing techniques in consideration of security loss.

Table 2 in FIG. 11 shows efficiency comparison of computation between the present disclosure and existing techniques in consideration of security loss.

As shown in Table 2 in FIG. 11, seeing the present disclosure and the existing techniques based on the computational costs when a private key is generated, it may be found that the present disclosure performs operations 28 times, but the existing techniques perform operation 100 to 1000 times. Therefore, in the present disclosure, the computational costs are reduced to be ⅕ to ⅙₀ of those of the existing techniques.

It may be found that the computational cost reduction of the present disclosure is found not only during the private key generating process but also during the encrypting and decrypting processes.

In addition, the public encryption method based on user ID may be stored on a computer-readable recording medium on which a program for the execution by a computer is recorded. At this time, the computer-readable recording medium includes all kinds of recording devices on which data readable by a computer system can be stored. The computer-readable recording device includes, for example, ROM, RAM, CD-ROM, DVD±ROM, DVD-RAM, a magnetic tape, a floppy disk, a hard disk, an optical data storage or the like. In addition, the computer-readable recording medium may be distributed to computers connected via a network so that computer-readable codes may be stored and executed in a distribution way.

The public encryption method based on user ID according to the present disclosure may allow efficient communication by using an inherent ID of a user as a public key, since a process for certifying the public key through a trusted third party is not needed.

In addition, the public encryption method based on user ID according to the present disclosure may reduce time and costs required for continuously maintaining or managing a discarded certificate list, since a certificate for a public key through a trusted third party is not used.

Moreover, the public encryption method based on user ID according to the present disclosure may allow the identity of a user, who is to perform communication, to be easily checked by checking a public key, since the ID of the user is used as the public key.

Further, the public encryption method based on user ID according to the present disclosure may reduce time and costs required for constructing a public key structure since a complicated PKI (Public Key Infrastructure) need not be constructed.

While the exemplary embodiments have been shown and described, it will be understood by those skilled in the art that various changes in form and details may be made thereto without departing from the spirit and scope of the present disclosure as defined by the appended claims.

What is claimed is:

1. A public encryption method, comprising:
   at a key generation server, receiving a security constant from outside the key generation server, selecting a first generator and a second generator among generators belonging to an elliptical curve group having the security constant as an input value, and selecting an arbitrary element among elements belonging to the elliptical curve group;
   at the key generation server, selecting a random number and setting the random number as a master key;
   at the key generation server, calculating a function value by applying the first generator, the second generator and the master key to a bilinear function; and
   at the key generation server, setting a public parameter to include at least one of the first generator, the second generator, the arbitrary element and the function value of the bilinear function;
   receiving, by the key generation server, an inherent ID of a user from a receiving terminal, generating a private key based on the public parameter, the master key and the ID, and transmitting the generated private key to the receiving terminal;
   receiving, by a transmitting terminal, the public parameter and the ID from the key generation server, encrypting a message to generate a ciphertext, and transmitting the generated ciphertext to the receiving terminal; and
   receiving, by the receiving terminal, the generated ciphertext and the private key, and decrypting the generated ciphertext based on the received private key to obtain the message.

2. The public encryption method according to claim 1, wherein said generating of the private key and transmitting of the generated private key to the receiving terminal, by the key generation server, includes:
   arbitrarily selecting a first random number;
   generating a first private key based on the second generator, the master key, the arbitrary element and the first random number;
   generating a second private key based on the first generator and the first random number;
   hashing the first private key and the second private key to generate a first tag value;
   generating a third private key based on a value obtained by hashing the ID, the arbitrary element, the first tag value and the first random number; and
   generating the private key including the first private key, the second private key and the third private key and transmitting the private key to the receiving terminal.

3. The public encryption method according to claim 2, wherein said encrypting of the message to generate the ciphertext, by the transmitting terminal, includes:
   arbitrarily selecting a second random number;
   generating a first ciphertext based on the function value of the bilinear function, the second random number and the message;
   generating a second ciphertext based on the first generator and the second random number;
   hashing the first ciphertext and the second ciphertext to generate a second tag value;
   generating a third ciphertext based on a value obtained by hashing the ID, the arbitrary element, the second tag value and the second random number; and
   said generating the ciphertext including the first ciphertext, the second ciphertext and the third ciphertext and transmitting the generated ciphertext to the receiving terminal.

4. The public encryption method according to claim 3, wherein said decrypting of the generated ciphertext to obtain the message, by the receiving terminal, includes:
   hashing the first private key and the second private key among private keys received from the key generation server to calculate a first tag value;
   hashing the first ciphertext and the second ciphertext among ciphertexts received from the transmitting terminal to calculate a second tag value;
   determining whether the first tag value is identical to the second tag value;
   determining whether the function value of the bilinear function to which the values obtained by hashing the second ciphertext and the ID, the arbitrary element and the calculated second tag value are applied is identical to a function value of a bilinear function to which the first generator and the third ciphertext are applied;

calculating a decrypting parameter based on the function value of the bilinear function to which the second ciphertext and the first private key are applied, the function value of the bilinear function to which the second ciphertext and the third private key are applied, the function value of the bilinear function to which the second private key and the third ciphertext are applied, the first tag value and the second tag value; and splitting the first ciphertext by the decrypting parameter to obtain the message.

5. A non-transitory computer-readable recording medium, on which a program for executing the method according to claim 1 is recorded.

* * * * *